United States Patent
Tanaka et al.

(10) Patent No.: US 7,330,630 B2
(45) Date of Patent: Feb. 12, 2008

(54) WAVEGUIDE TYPE VARIABLE OPTICAL ATTENUATOR

(75) Inventors: Koutarou Tanaka, Nakagun Toukaimura (JP); Nobuaki Kitano, Hitachi (JP); Yukio Abe, Hitachi (JP); Haruyasu Komano, Hitachi (JP)

(73) Assignee: Hitachi Cable, Inc., Tokyo (JP)

( * ) Notice: Subject to any disclaimer, the term of this patent is extended or adjusted under 35 U.S.C. 154(b) by 0 days.

(21) Appl. No.: 11/373,913

(22) Filed: Mar. 14, 2006

(65) Prior Publication Data

US 2007/0065088 A1 Mar. 22, 2007

(30) Foreign Application Priority Data

Sep. 21, 2005 (JP) .............................. 2005-273836

(51) Int. Cl.
*G02B 6/26* (2006.01)

(52) U.S. Cl. ...................................... 385/140; 385/139

(58) Field of Classification Search ................... 385/14, 385/39, 129, 131, 132, 140
See application file for complete search history.

(56) References Cited

U.S. PATENT DOCUMENTS 6,208,798 B1 * 3/2001 Morozov et al. ........... 385/140
6,819,859 B2 * 11/2004 Hatayama et al. .......... 385/140
2004/0047583 A1 * 3/2004 Chiba et al. ................ 385/140

FOREIGN PATENT DOCUMENTS

| JP | 2687362 B2 | | 8/1997 |
| JP | 2002268021 A | * | 9/2002 |
| JP | 2003-084252 A | | 3/2003 |
| JP | 2005321711 A | * | 11/2005 |

* cited by examiner

*Primary Examiner*—Kevin S. Wood
(74) *Attorney, Agent, or Firm*—Foley & Lardner LLP

(57) ABSTRACT

A waveguide type variable optical attenuator is provided with a substrate for forming a waveguide for optical signal propagation; a waveguide element comprising 2 arm waveguides arranged on the surface of the substrate for constituting a portion of the waveguide and cladding for covering the arm waveguides and the surface of the substrate; and a heater arranged on the surface of the waveguide element for heating the arm waveguides. The 2 arm waveguides are connected thermally.

14 Claims, 11 Drawing Sheets

FIG.11

# WAVEGUIDE TYPE VARIABLE OPTICAL ATTENUATOR

The present application is based on Japanese patent application No. 2005-273836, the entire contents of which are incorporated herein by reference.

BACKGROUND OF THE INVENTION

1. Field of the Invention

The present invention relates to a waveguide type variable optical attenuator used widely in optical communications.

2. Description of the Related Art

Generally, in optical communications, there is widely used a waveguide type variable optical attenuator as an optical waveguide for attenuating light.

Figure 1A:
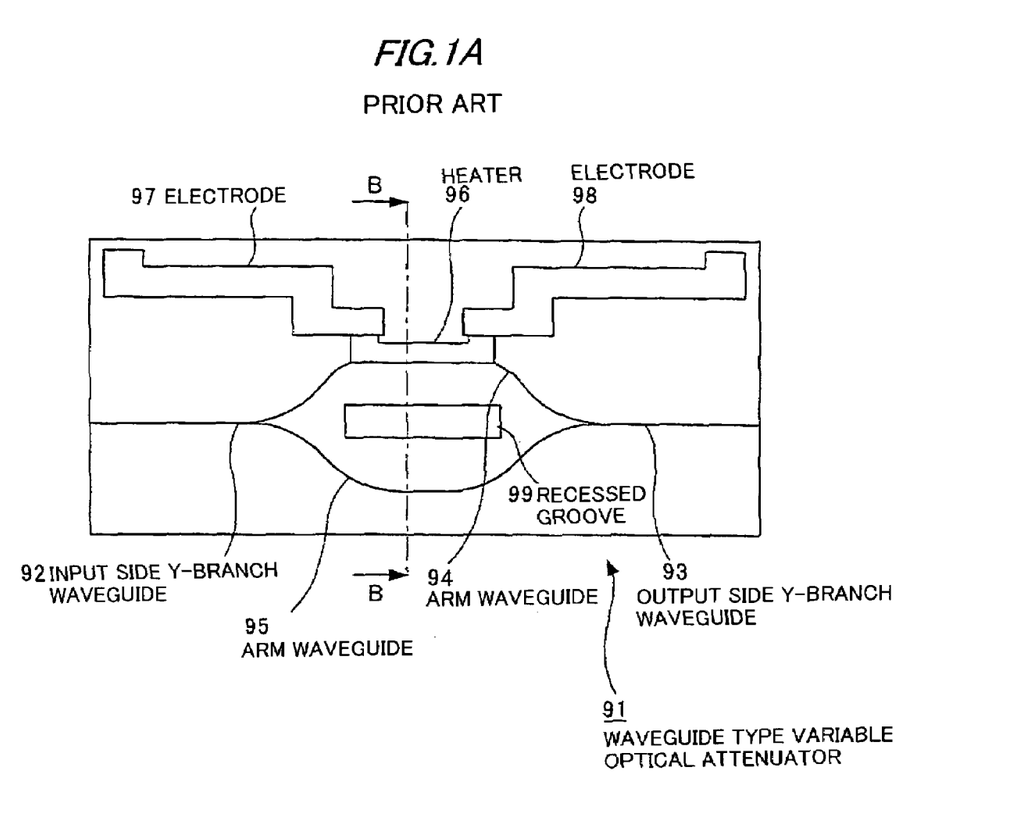
FIGS. 1A and 1B are respectively a plan view and a cross-sectional view along line B-B for explaining a conventional waveguide type variable optical attenuator (1)
Figure 1B:
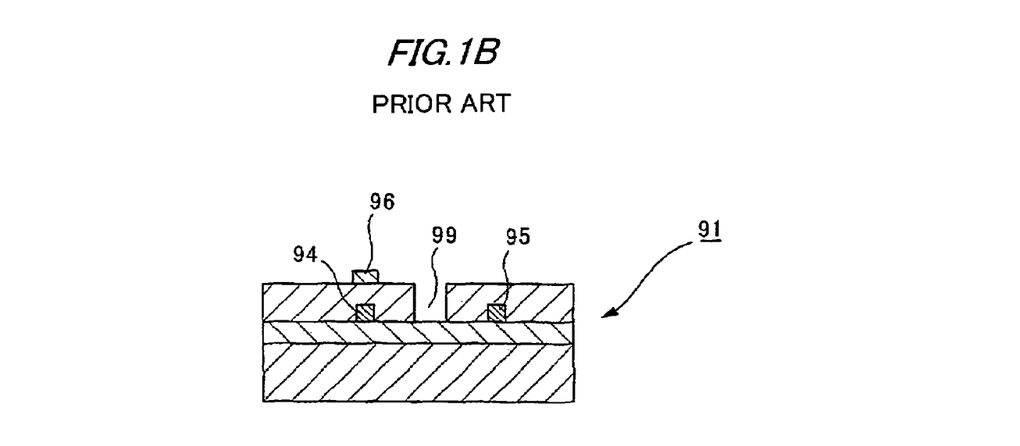

In prior art, a conventional waveguide type variable optical attenuator of this kind is shown in FIGS. 1A and 1B (See JP-A-2003-84252). This waveguide type variable optical attenuator 91 (the waveguide type optical component) comprises a Mach-Zehnder optical interference system formed using parallel input and output side Y-branch waveguides 92 and 93 arranged with a predetermined interval and 2 arm waveguides 94 and 95 for connecting these Y-branch waveguides 92 and 93; a heater 96 that serves as a phase shifter for heating one arm waveguide 94 of the arm waveguides 94 and 95 of this interference system, electrodes 97 and 98 formed for applying voltage to the heater 96, and a recessed groove 99 formed between the arm waveguides 94 and 95 so as not to transmit heater heat to the arm waveguide 95.

In such a waveguide type variable optical attenuator 91, when voltage is applied to the heater 96, the arm waveguide 94 is heated, so that the refractive index of the arm waveguide 94 is varied. Since this causes a difference in apparent optical path lengths of light propagated through both the arm waveguides 94 and 95, i.e., a variation in propagated light phases due to a thermal optical effect, the intensity of optical signals can be arbitrarily controlled by adjusting voltage applied to the heater 96.

Figure 2:
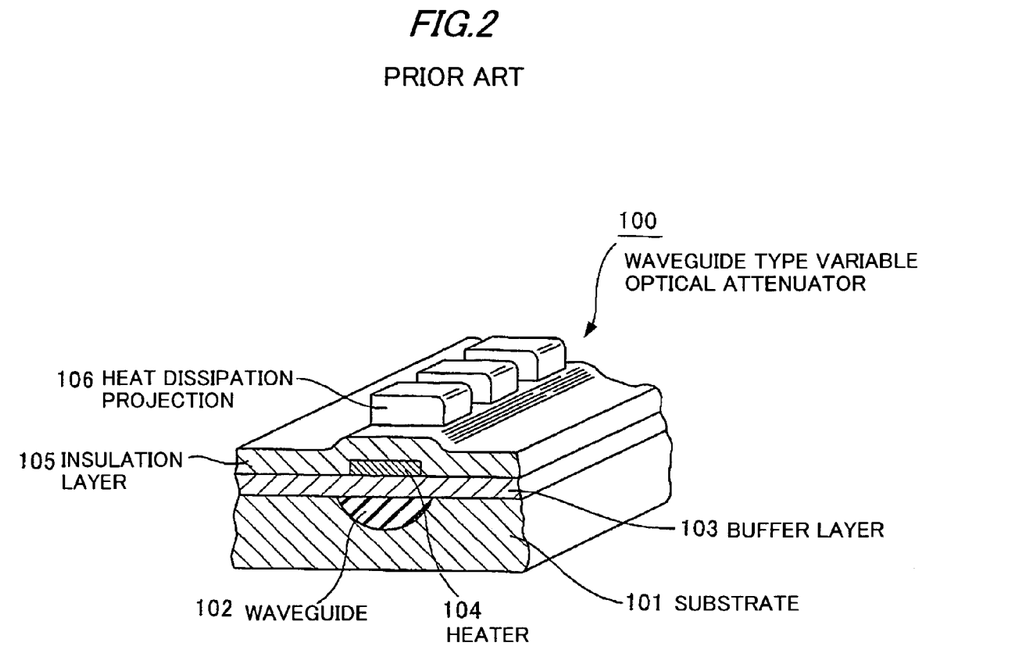
FIG. 2 is a perspective view for explaining a conventional waveguide type variable optical attenuator (2)

As shown in FIG. 2, a conventional waveguide type variable optical attenuator (an optical switch) 100 has been proposed that comprises a waveguide 102 embedded in a substrate 101 excluding a portion, a heater 104 arranged on the substrate 101 via a buffer layer 103 to cover the waveguide 102, an insulation layer 105, and a heat dissipation projection 106 arranged in a region corresponding to the heater 104 (See JP-B-2687362).

In such a waveguide type variable optical attenuator, heat caused when the heater 104 is ON is forcedly dissipated from the heat dissipation projection 106 when the heater 104 is OFF, which can thereby result in an optical switching element that is capable of fast switching.

Use of such a waveguide type variable optical attenuator as an optical communication device requires considerably fast response time (10 msec or less).

In JP-A-2003-84252, however, because the heater 96 simply heats one arm waveguide 94 of the 2 arm waveguides 94 and 95, no desired response time can be obtained.

In JP-B-2687362, although heat caused by the heater 104 is dissipated from the heat dissipation projection 106 to thereby realize a fast optical switch, because the heater 104 simply heats the waveguide 102, no desired response time can be obtained similarly to the waveguide type variable optical attenuator shown in JP-A-2003-84252.

SUMMARY OF THE INVENTION

Accordingly, it is an object of the present invention to provide a waveguide type variable optical attenuator that is capable of reducing the period of time from voltage application start to the heater to obtain specified optical attenuation, and thereby attaining desired response time.

The inventors study enhancing response time of the waveguide type variable optical attenuator using the optical interference system. As a result, they find that the period of time from voltage application start to the heater to obtain specified optical attenuation (the period of time the temperature difference between the 2 arm waveguides reaches a specified temperature difference) is reduced by thermally connecting the 2 arm waveguides.

(1) According to one aspect of the invention, a waveguide type variable optical attenuator comprises:

a substrate for forming a waveguide for optical signal propagation;

a waveguide element comprising 2 arm waveguides arranged on the surface of the substrate for constituting a portion of the waveguide and cladding for covering the arm waveguides and the surface of the substrate; and a heater arranged on the surface of the waveguide element for heating the arm waveguides, wherein:

the 2 arm waveguides are connected thermally.

(2) According to another aspect of the invention, a waveguide type variable optical attenuator comprises:

a substrate for forming a waveguide for optical signal propagation;

a waveguide element comprising 2 arm waveguides arranged on the surface of the substrate for constituting a portion of the waveguide and cladding for covering the arm waveguides and the surface of the substrate; and a heater arranged on the surface of the waveguide element for heating the arm waveguides, wherein:

a maximal portion of the spacing between the 2 arm waveguides is on substantially the same order as or more than the spacing in which their optical characteristics are affected by each other.

(3) According to one aspect of the invention, a waveguide type variable optical attenuator comprises:

a substrate for forming a waveguide for optical signal propagation;

a waveguide element comprising 2 arm waveguides arranged on the surface of the substrate for constituting a portion of the waveguide and cladding for covering the arm waveguides and the surface of the substrate; and a heater arranged on the surface of the waveguide element for heating the arm waveguides, wherein:

the 2 arm waveguides are connected thermally by a high thermal-conductivity member that covers the heater, and is arranged on the surface of the waveguide element.

In the above inventions (1) and (2), the following modifications and changes can be made.

(a) During heater electrical conduction, when the temperature of one arm waveguide of the 2 arm waveguides that is adjacent to the heater is $T_1$, and the temperature of the other arm waveguide is $T_2$, and during no heater electrical conduction, when the temperature of one arm waveguide and the other arm waveguide is $T_3$, $T_1 > T_2 > T_3$.

(b) The middle dimension L between the 2 arm waveguides is set to range 30 μm $\leq$ L $\leq$ 250 μm.

(c) The substrate comprises a quartz glass substrate.

In the above invention (3), the following modifications and changes can be made.

(d) The thermal conductivity α of the high thermal-conductivity member is set to thermal expansivity ranging 100 W/mK≦α≦500 W/mK.

(e) The high thermal-conductivity member is arranged above the heater side arm waveguide of the 2 arm waveguides, and extends to the surface of the waveguide element adjacent to the other arm waveguide.

(f) The high thermal-conductivity member is arranged on the surface of the waveguide element via an electrical insulation layer, and the heater is covered with the electrical insulation layer.

<Advantages of the Invention>

According to the present invention, it is possible to reduce the period of time from voltage application start to the heater to obtain specified optical attenuation, and to thereby attain desired response time.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 3:
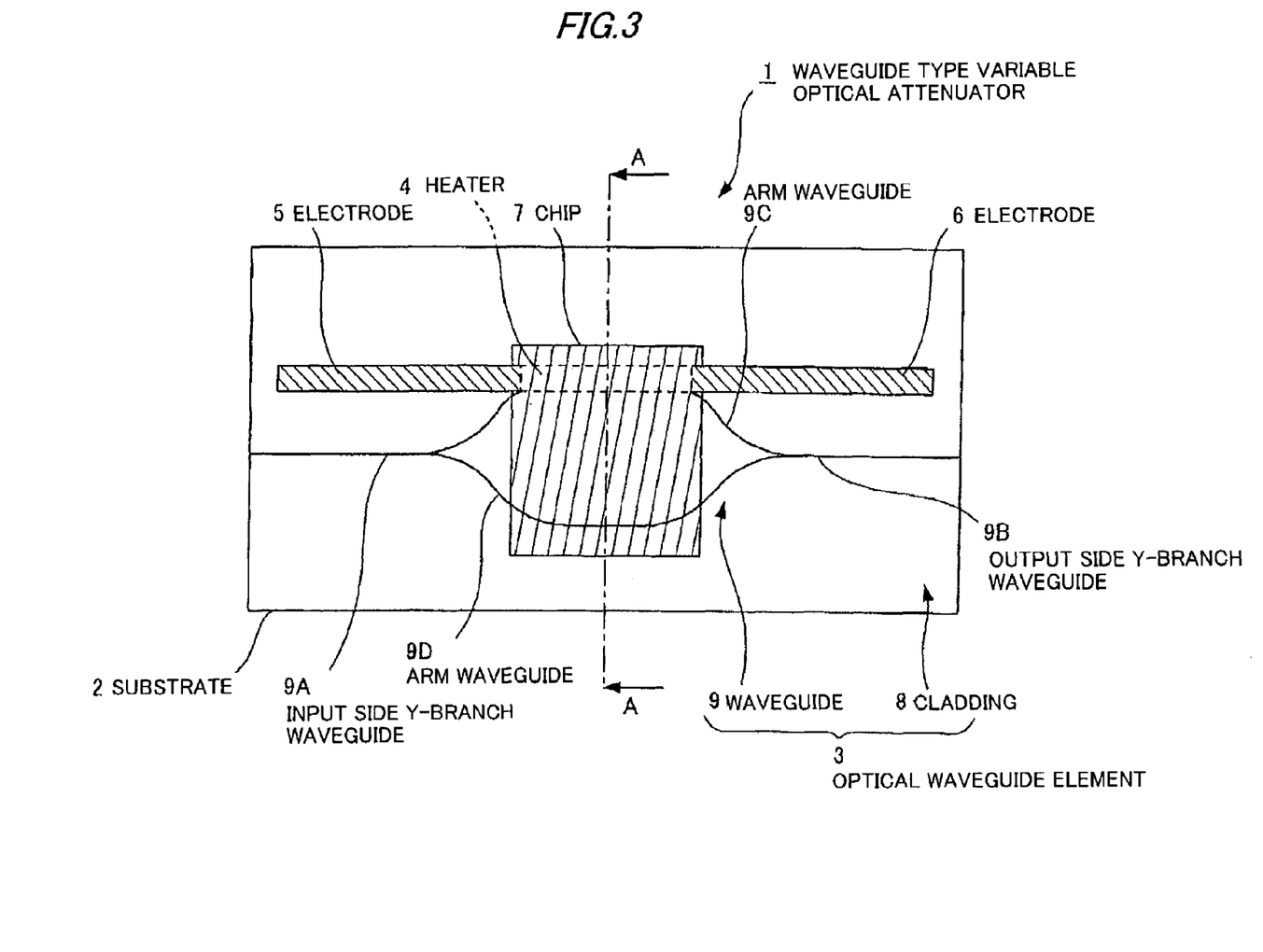
FIG. 3 is a plan view showing a waveguide type variable optical attenuator according to an embodiment of the present invention.
Figure 4:
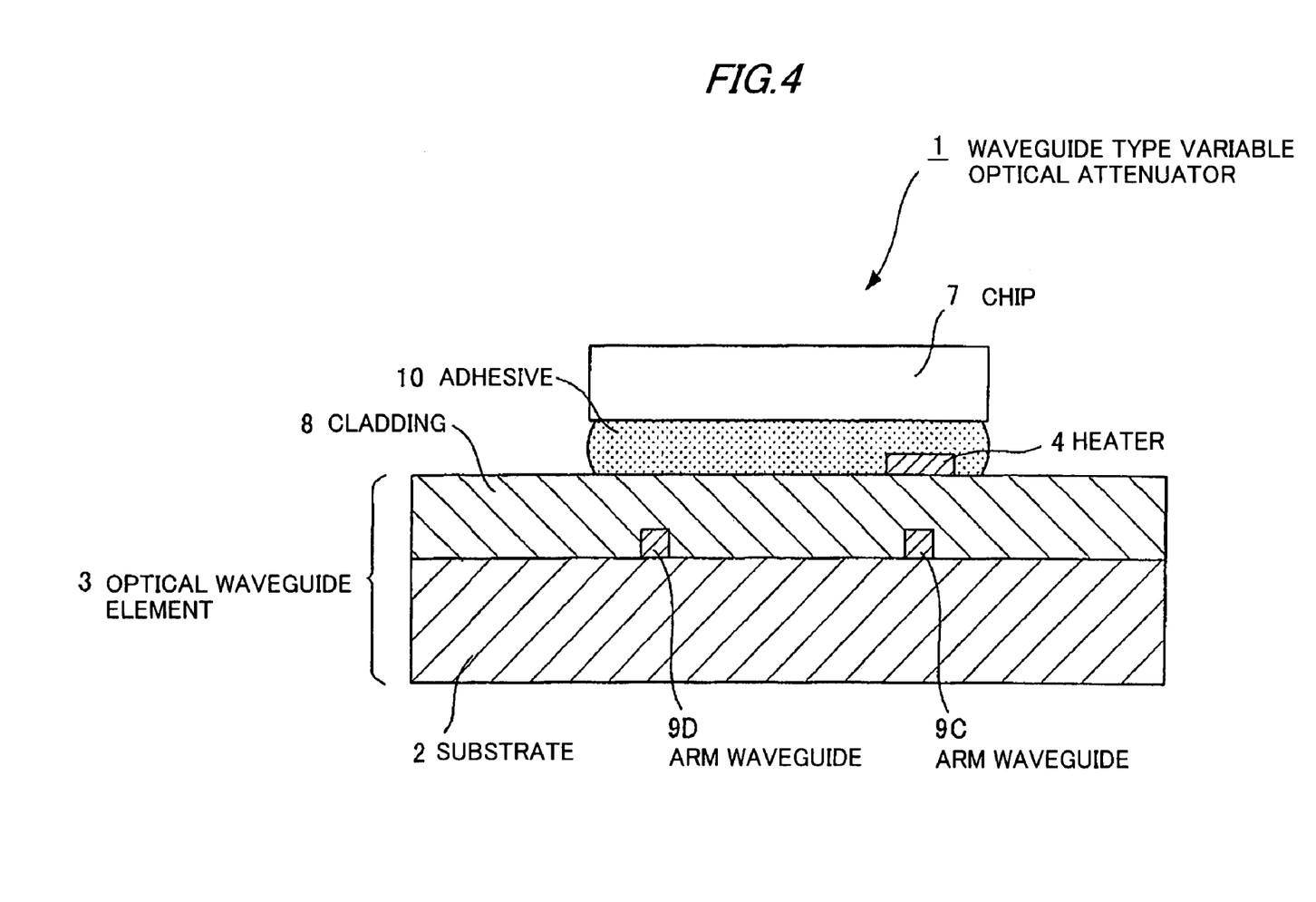
FIG. 4 is a cross-sectional view along line A-A of FIG. 3.

FIG. 3 is a plan view showing a waveguide type variable optical attenuator according to an embodiment of the present invention. FIG. 4 is a cross-sectional view along line A-A of FIG. 3.

In FIGS. 3 and 4, a waveguide type variable optical attenuator 1 comprises substantially a substrate 2 for forming a waveguide 9 for optical signal propagation, an optical waveguide element 3 comprising the waveguide 9 and cladding 8, a heater (preferably a thin film heater) 4 that serves as a phase shifter, electrodes 5 and 6 for voltage supply, and a chip 7 formed of a high thermal conductive member.

The substrate 2 is entirely formed of a rectangular quartz plate, and constructed so that the optical waveguide element 3, the heater 4, the electrodes 5 and 6 and the chip 7 are packaged on its top.

Figure 11:
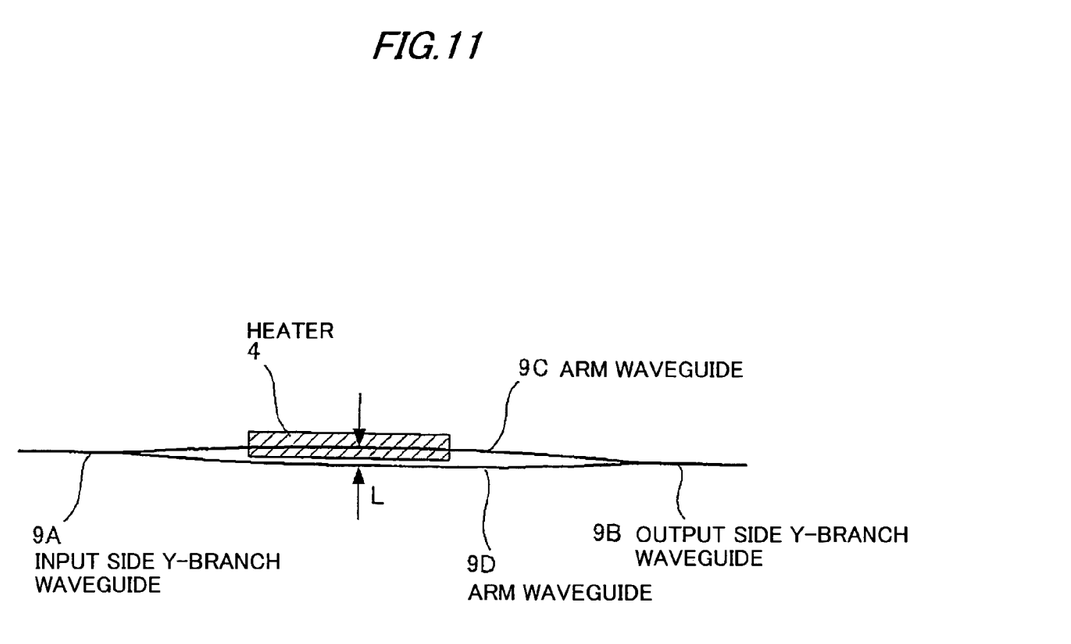
FIG. 11 is a plan view for explaining a modified example (3) of a waveguide type variable optical attenuator according to an embodiment of the present invention.

As shown in FIGS. 3 and 4, the optical waveguide element 3 comprises the cladding 8 and the waveguide 9 (core diameter 8 μm), and arranged on the substrate 2. The cladding 8 is formed of a $SiO_2$ film and constructed to cover the waveguide 9. The waveguide 9 comprises a Mach-Zehnder interference system comprising parallel input and output side Y-branch waveguides 9A and 9B arranged with a predetermined interval and 2 arm waveguides 9C and 9D for connecting these Y-branch waveguides 9A and 9B, and formed of a Ge-doped $SiO_2$ layer with the relative refractive index difference being 0.3%. The middle dimension L between both the arm waveguides 9C and 9D shown in FIG. 11 is on the same order or more to spacing in which their optical characteristics have an effect on each other (for example, light is coupled together). Here, the middle dimension L between both the arm waveguides 9C and 9D is set to a maximal dimension of dimensions between both the arm waveguides.

As shown in FIGS. 3 and 4, the heater 4 is arranged on the cladding 8, and constructed to heat a middle portion of, for example, one arm waveguide 9C of the arm waveguides 9C and 9D. The resistance value of the heater 4 is set to the order of 300 Ω. The heater 4 may also be constructed to heat a middle portion of the other arm waveguide 9D instead of heating the middle portion of one arm waveguide 9C.

As shown in FIG. 3, the electrodes 5 and 6 are arranged on the cladding 8, and connected to the heater 4, and constructed to supply power supply voltage to the heater 4.

As shown in FIGS. 3 and 4, the chip 7 is arranged and bonded with adhesive 10 on the cladding 8 via the heater 4, and placed to cover a peripheral region of the arm waveguides 9C and 9D (i.e., the arm waveguides 9C and 9D and a region therebetween), and formed of a planar rectangular high thermal-conductivity member made of Si (silicon) with the thermal conductivity being 160 W/mK, and is constructed to thermally connect both the 2 arm waveguides 9C and 9D and thereby reduce response time of the waveguide type variable optical attenuator 1. The planar size (length and width dimensions) of the chip 7 is set to, e.g., length 39.6 mm and width 5.6 mm, so as to cover the middle portion of the arm waveguides 9C and 9D and the heater 4. Also, the thickness of the chip 7 is set to a sufficient dimension (e.g., 1 mm) for efficient thermal conduction between both the arm waveguides 9C and 9D.

As materials of the chip 7, besides Si, there is used Al (aluminum: thermal conductivity 237 W/mK) or Cu (copper: thermal conductivity 401 W/mK) that has sufficiently higher thermal conductivity than the thermal conductivity of $SiO_2$ (quartz glass), 1.3 W/mK. Also, as the adhesive 10, there is used silicon resin grease whose thermal conductivity is as relatively high as 1.1 W/mK, but any other material may be used that enables bonding of the chip 7 and the cladding 8.

Next, a fabrication method of the waveguide type variable optical attenuator 1 according to an embodiment of the present invention will be explained.

A Ge-doped $SiO_2$ film that serves as a waveguide 9 is first formed on a substrate 2 using CVD (chemical vapor phase deposition) A pattern of the waveguide 9 (a Mach-Zehnder interference system) is then formed on the Ge-doped $SiO_2$ film using photolithography, followed by formation of the arm waveguide 9 using etching such as RIE (reactive ion etching). Using film deposition such as CVD, a $SiO_2$ film that serves as cladding 8 is formed on the waveguide 9. Subsequently, using semiconductor fabrication techniques such as photolithography and RIE, a heater 4 and electrodes 5 and 6 are formed on the cladding 8, followed by bonding of a chip 7 made of Si with adhesive 10 to cover the heater 4, portions of electrodes 5 and 6 and middle upper portions of the arm waveguides 9C and 9D.

Next, referring to FIGS. 5 and 6 using an equivalent circuit, a thermal conduction mechanism (thermal response) will be explained that determines response time of the waveguide type variable optical attenuator 1 using the Mach-Zehnder optical interference circuit in the present embodiment.

Figure 5:
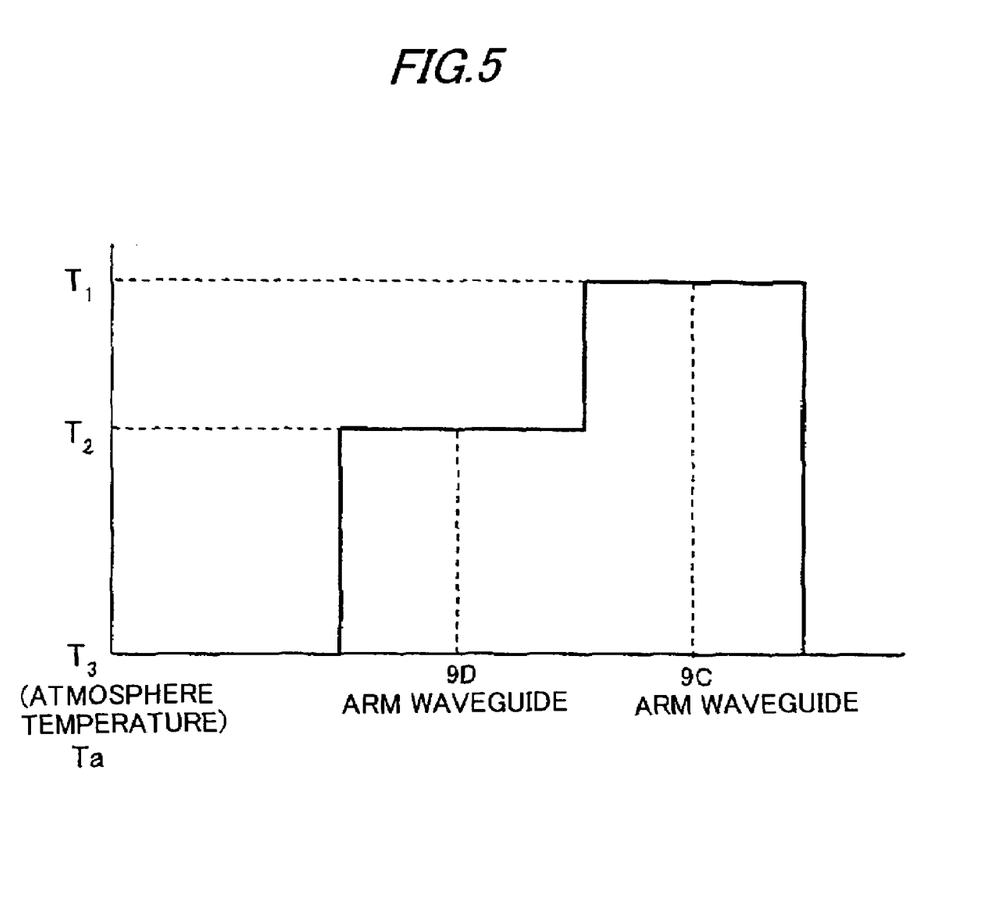
FIG. 5 is a graph showing temperature distribution during heater electrical conduction in an arm waveguide of a waveguide type variable optical attenuator according to an embodiment of according to the present invention.

FIG. 5 is a graph showing temperature distribution during heater electrical conduction in an arm waveguide (in the vicinity of line A-A of FIG. 3) of a waveguide type variable optical attenuator according to an embodiment of according to the present invention. $T_3$ is temperature of the arm waveguides 9C and 9D during no electrical conduction in the heater 4, which is generally atmosphere temperature ($T_a$). During heater electrical conduction, because of thermal conduction through the arm waveguide 9D by the chip 7, when the temperature of the arm waveguide 9D is $T_2$, $T_2 > T_3$. Because the arm waveguide 9C is arranged around directly beneath the heater 4, when the temperature of the arm waveguide 9C during heater electrical conduction is $T_1$, $T_1 > T_2 > T_3$. By using this temperature difference ($T_1 - T_2$), the present waveguide type variable optical attenuator 1 attenuates light. Because of $T_2 > T_3$, fast switching is possible.

Figures 6A, 6B:
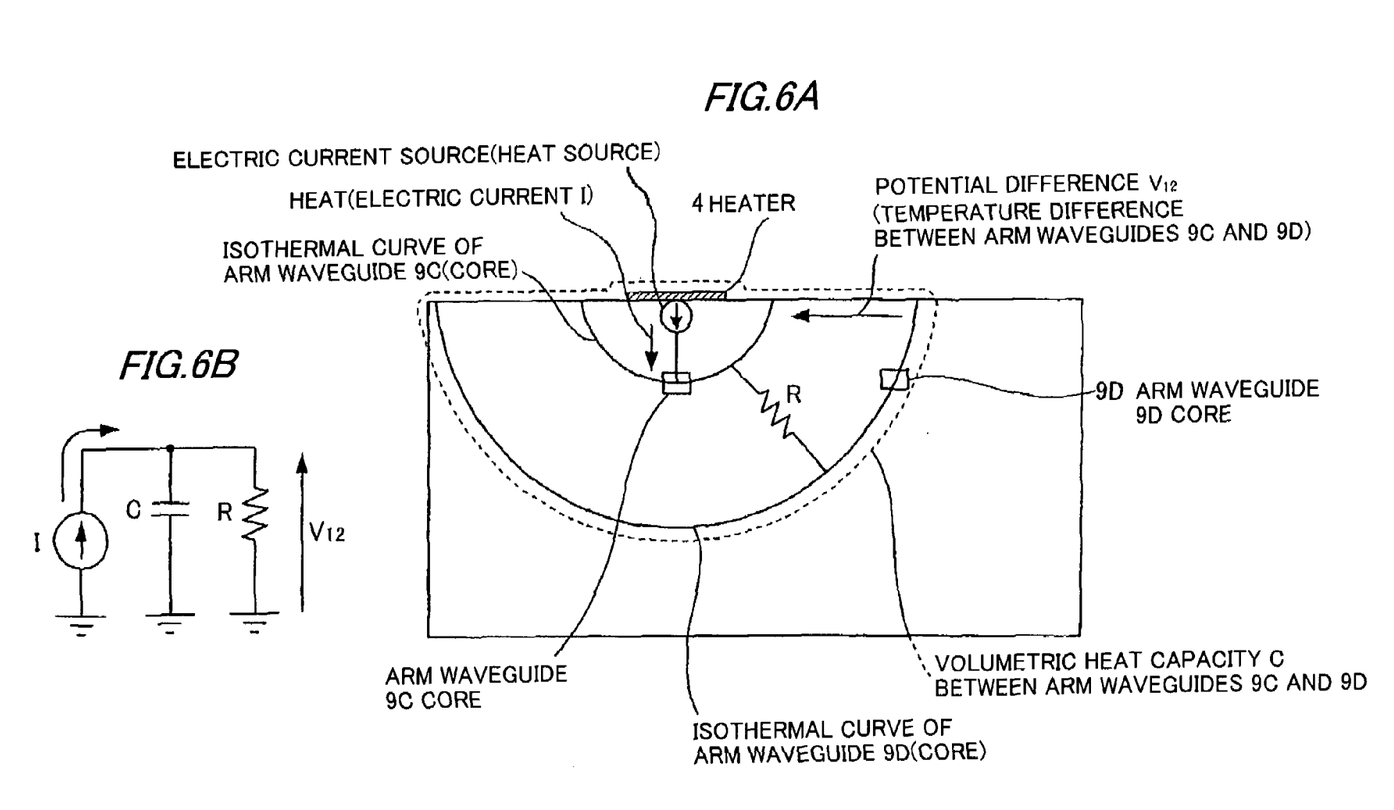
FIGS. 6A and 6B are respectively a cross-sectional view and an equivalent circuit diagram for explaining thermal response of a waveguide type variable optical attenuator according to an embodiment of the present invention in the case of use of an equivalent circuit.

FIGS. 6A and 6B are respectively a cross-sectional view and an equivalent circuit diagram for explaining thermal response of a waveguide type variable optical attenuator according to an embodiment of the present invention in the case of use of an equivalent circuit.

As shown in FIG. 6, the temperature difference between the 2 arm waveguides 9C and 9D may be replaced with a potential difference $V_{12}$ in the equivalent circuit.

Because the heater 4 feeds a particular amount of heat in response to voltage from power supply, the particular amount of heat may be replaced with the power supply with current I. This causes the consumed power of the waveguide type variable optical attenuator 1 to be proportional to the current I in the equivalent circuit.

The arm waveguide 9C absorbed heat from the heater 4 by an amount of heat capacity, while releasing unabsorbed heat into a peripheral region of the arm waveguide 9D (core) including the core in response to thermal conductivity. For this reason, the heat capacity of the volume between both the arm waveguides 9C and 9D may be replaced with capacitance C of a capacitor, and the thermal resistance (corresponding to thermal conductivity) in releasing heat unabsorbed by the arm waveguide 9C into a peripheral region of the arm waveguide 9D (core) including the core may be replaced with resistance R of a resistor.

Here, the thermal response of the waveguide type variable optical attenuator may be replaced with the equivalent circuit in which the power supply (the current I) is connected to the arm waveguide 9C, and the capacitor C and the resistor R are connected in parallel between the arm waveguides 9C and 9D.

As the attenuated output of light is determined by the temperature difference between both the arm waveguides 9C and 9D, the response time of the waveguide type variable optical attenuator 1 may be replaced with transient response characteristic of the potential difference $V_{12}$ of the arm waveguide 9C when the arm waveguide 9D is at "0" potential in the above equivalent circuit.

From a transient response theory, the response of the potential difference $V_{12}$ is expressed by the following formula:

$$V_{12}(t)=IR\{1-\exp(-t/\tau)\}, \tau=RC,$$

Where $\tau$ is a time constant, and is equal to a period of time until $V_{12}$ reaches 63.2% of a final value.

Thus reducing the value for $\tau$ (=RC) reduces the response time of $V_{12}$ in the equivalent circuit. Reducing the response time of $V_{12}$ reduces time for the temperature difference between both the arm waveguides 9C and 9D of the waveguide type variable optical attenuator 1. That is, to reduce the response time of the waveguide type variable optical attenuator 1, the thermal distance (thermal resistance R) between both the arm waveguides 9C and 9D may be reduced.

The response time of $V_{12}$ is expressed as $\tau=RC$.

On the other hand, the consumed power of the optical attenuator is expressed as consumed current $I=V_{12}/R$.

From the above 2 expressions, $\tau I=V_{12}C$ ($V_{12}$ is a constant determined by design.)

$\tau I$ is a value of the product of the response time and the consumed power, and therefore to reduce the response time and the consumed power, the thermal capacity C may be reduced.

Since the thermal distance (thermal resistance R) and the thermal capacity C between both the arm waveguides 9C and 9D can be reduced, the response time of the optical attenuator can be reduced. Also, the consumed power can at the same time be reduced.

Accordingly, in this embodiment, to reduce the response time of the waveguide type variable optical attenuator 1, both the arm waveguides 9C and 9D are thermally connected by the chip 7 made of a high thermal-conductivity member (Si).

Next, the response time will be compared and examined for a waveguide type variable optical attenuator using high thermal-conductivity members whose thermal conductivities are mutually different, and a waveguide type variable optical attenuator using no high thermal-conductivity member.

There are prepared waveguide type variable optical attenuators using a Si chip or an Al chip or a Cu chip each having a different thermal conductivity as high thermal-conductivity members, and a conventional waveguide type variable optical attenuator using no high thermal-conductivity member. Voltage is applied to heaters of these waveguide type variable optical attenuators, to measure optical waveguide outputs for each specified time.

As a result, when the time of reaching 90% of each optical waveguide output is response time of each waveguide type variable optical attenuator, the response time of the conventional waveguide type variable optical attenuator is 30 msec, whereas the response times of the waveguide type variable optical attenuators using a Si chip, an Al chip and a Cu chip as high thermal-conductivity members are about 8 msec, about 2.5 msec, and about 2.0 msec.

Figure 7:
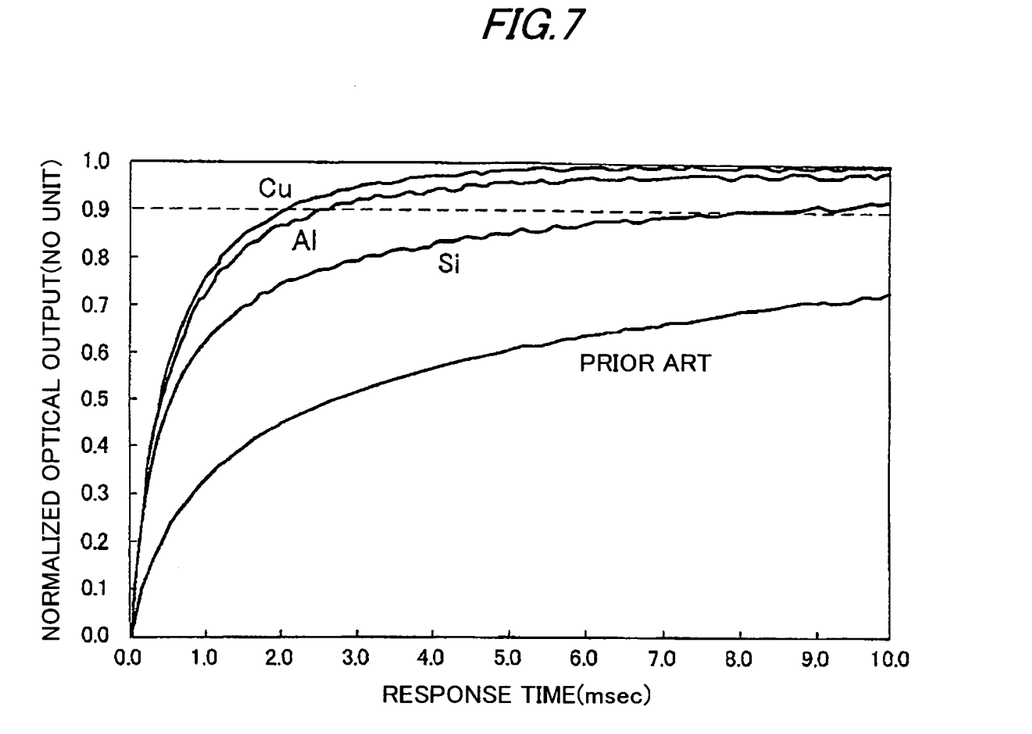
FIG. 7 is a graph showing the relationship between optical losses and response time in an arm waveguide of a waveguide type variable optical attenuator according to an embodiment of the present invention.

Thus it is verified that the response times of the waveguide type variable optical attenuators using the high thermal-conductivity members are reduced compared to the response time of the conventional waveguide type variable optical attenuator using no high thermal-conductivity member, and that the response time is reduced with increasing thermal conductivity of the high thermal-conductivity member between the waveguide type variable optical attenuators using the high thermal-conductivity members. This is shown in the graph of FIG. 7 (the vertical axis shows normalized optical output (no unit), and the horizontal axis shows response time (msec)).

It is also verified that, in the waveguide type variable optical attenuator, in the case of use of a high thermal-conductivity member having the thermal conductivity a of larger than 500 W/mK, its response time is not significantly affected, and that, in the case of use of a high thermal-conductivity member having the thermal conductivity of smaller than 100 W/mK, its response time is 10 msec or more, which has no practical effect.

Figure 8:
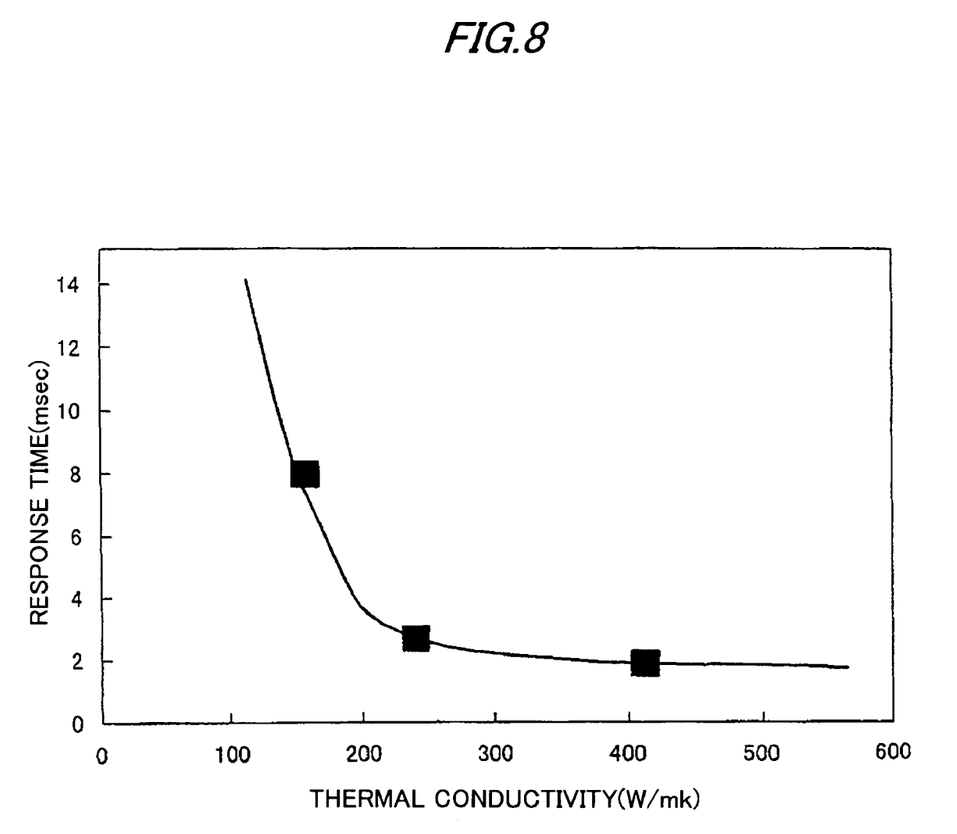
FIG. 8 is a graph showing the relationship between thermal conductivity and response time of a high thermal-conductivity member used in a waveguide type variable optical attenuator according to an embodiment of the present invention.

Thus it is desirable that the thermal conductivity a of the high thermal-conductivity member be set to thermal expansivity ranging 100 W/mK≦α≦500 W/mK (As the high thermal-conductivity member, material having α>500 W/mK may be used.). This is shown in the graph of FIG. 8 (the vertical axis shows response time (msec), and the horizontal axis shows thermal conductivity (W/mK)).

The above-explained embodiments have the following advantages:

Since the 2 arm waveguides 9C and 9D are thermally connected by the chip 7 made of the high thermal-conductivity member, the period of time from voltage application start to the heater 4 to obtain specified optical attenuation is reduced, thereby allowing obtaining desired response time.

Although the waveguide type variable optical attenuators of the present inventions have been explained according to the above embodiments, the present inventions are not limited thereto, but are possible to implement in various forms within the range not departing from its gist. For example, the following modifications are also possible.

Figure 9:
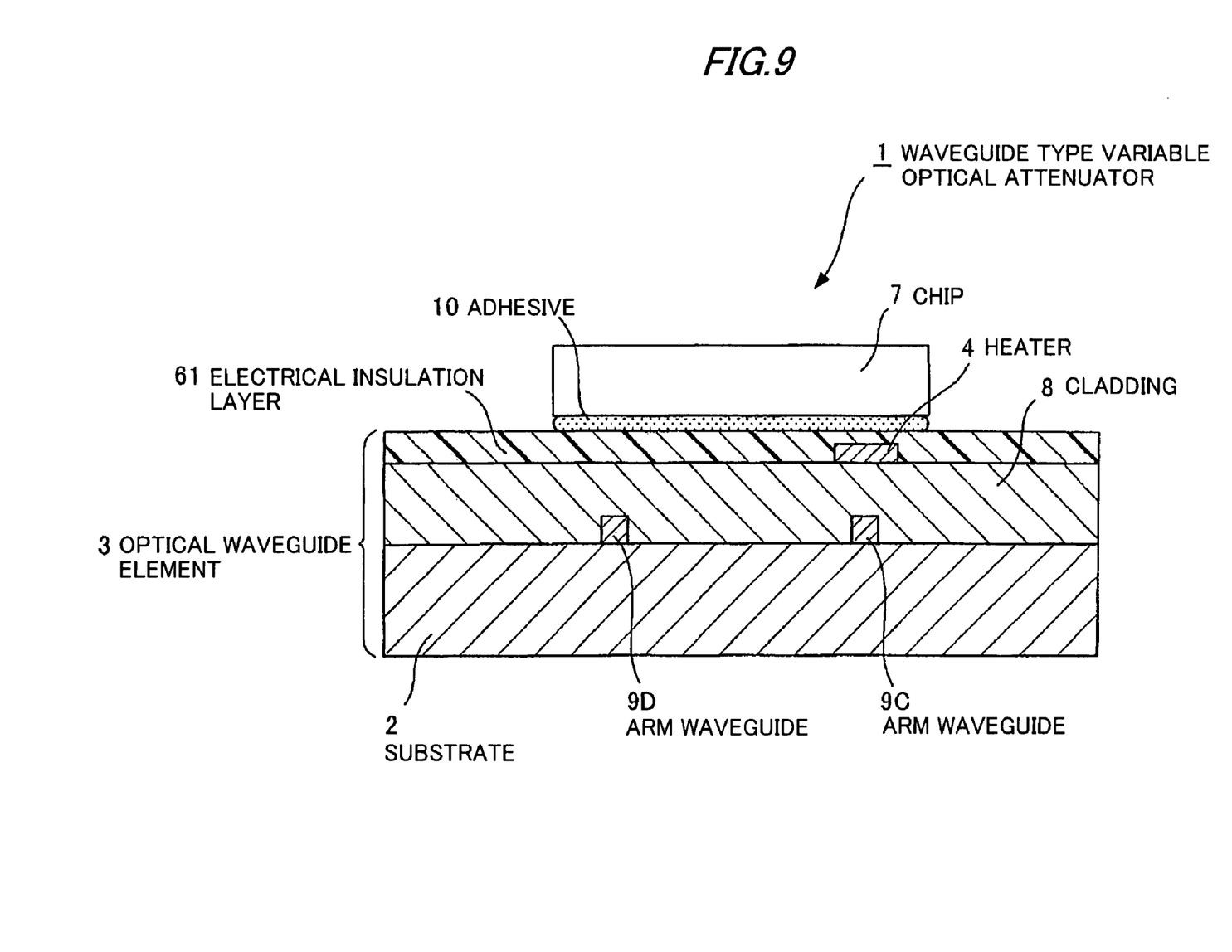
FIG. 9 is a cross-sectional view for explaining a modified example (1) of a waveguide type variable optical attenuator according to an embodiment of the present invention.

(1) In this embodiment, although the chip 7 is bonded on the cladding 8 with the adhesive 10, the present invention is not limited thereto, but an electrical insulation layer 61 (thickness 3 μm) may be formed on the cladding 8 as a protective film made of a SiO$_2$ layer that covers the heater 4, and the chip 7 may be arranged on this electrical insulation layer 61 with the adhesive 10, as shown in FIG. 9. In this case, the dimension of the electrical insulation layer 61 thickness plus the adhesive 10 thickness is set to 30 μm or less. As the adhesive 10, any other material may be used that enables bonding of the chip 7 and the electrical insulation layer 61.

Figure 10:
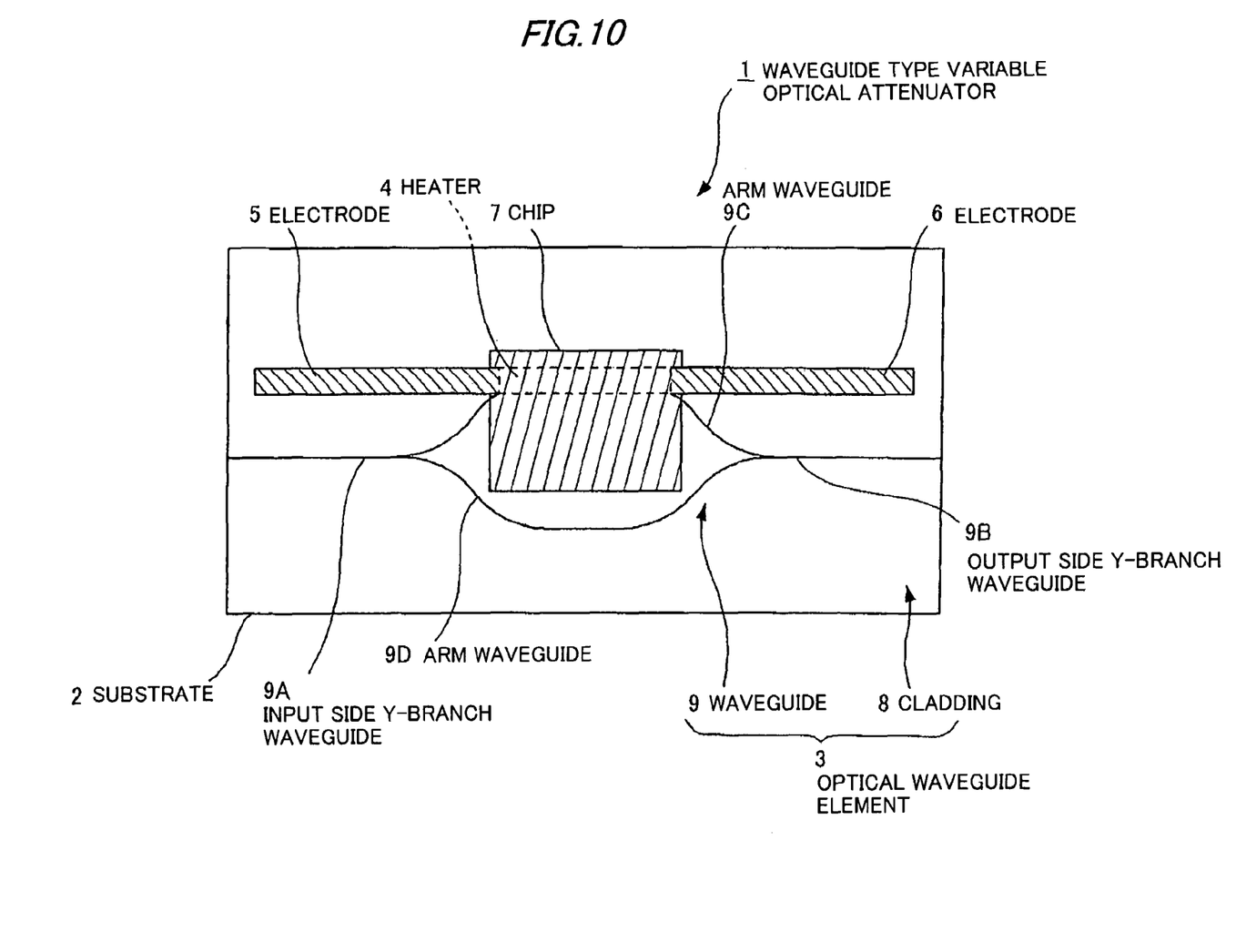
FIG. 10 is a plan view for explaining a modified example (2) of a waveguide type variable optical attenuator according to an embodiment of the present invention.

(2) In this embodiment, although the chip 7 is placed above the heater 4 to cover both the arm waveguides 9C and 9D and a region therebetween), the present invention is not limited thereto, but the chip 7 may be arranged to cover the arm waveguide 9C and a region between this arm waveguide 9C and a position close to the arm waveguide 9D, as shown in FIG. 10. That is, in the present invention, providing that heat caused by the heater 4 is conducted to the arm waveguide 9D, the chip 7 may be arranged to cover at least one arm waveguide to be heated by the heater 4.

(3) In this embodiment, it is desirable that, regarding the middle spacing (gap) L between both the arm waveguides 9C and 9D, the arm waveguides 9C and 9D be arranged close to each other. In this case, to reduce thermal resistance R, instead of using the thermal-conductivity member to reduce thermal distance, the thermal distance may be reduced by reducing physical distance. As mentioned previously, this allows thermal resistance R and thermal capacity C between both the arm waveguides 9C and 9D to be reduced, thereby allowing reducing response time and consumed power. Also, in the case of an optical waveguide element with refractive index difference 0.3% and core diameter 8 μm, when the spacing L between both the arm waveguides 9C and 9D is smaller than 30 μm, optical coupling occurs at both the arm waveguides 9C and 9D, affecting optical characteristics. For this reason, the lower limit of the spacing L may be on the order of 30 μm. Even in the case of a conventional general spacing of the order of 250 μm, by using a high thermal-conductivity member, it is possible to obtain response time on the same order as in the case of the spacing L=30 μm.

(4) In this embodiment, although the chip 7 is placed above the arm waveguides 9C and 9D, the present invention is not limited thereto, but the chip 7 may be placed below the arm waveguides 9C and 9D, which has an effect similar to that of the embodiment.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A waveguide type variable optical attenuator, comprising:
   a substrate for forming a waveguide for optical signal propagation;
   a waveguide element comprising a first arm waveguide and a second arm waveguide arranged on a surface of the substrate for constituting a portion of the waveguide and cladding for covering the first and second arm waveguides and the surface of the substrate;
   an output side waveguide connecting the first arm waveguide with the second arm waveguide and arranged to couple light from the first arm waveguide with light from the second arm waveguide; and
   a heater arranged on a surface of the waveguide element for heating the first and second arm waveguides, wherein:
   the first and second arm waveguides and the output side waveguide constitute one optical interference circuit, the first and second arm waveguides are connected thermally to each other by a high thermal-conductivity member that covers the heater, the high thermal-conductivity member being different from the heater.

2. The waveguide type variable optical attenuator according to claim 1, wherein:
   a length L of a spacing between the first and second arm waveguides at a center part is substantially equal to or more than that of a spacing in which optical characteristics of the first and second arm waveguides are affected by each other.

3. The waveguide type variable optical attenuator according to claim 1, wherein:
   when a temperature of the first arm waveguide adjacent to the heater during heater electrical conduction is $T_1$, a temperature of the second arm waveguide during heater electrical conduction is $T_2$, and
   a temperature of the first and second arm waveguides during no heater electrical conduction is $T_3$, $T_1 > T_2 > T_3$.

4. The waveguide type variable optical attenuator according to claim 2, wherein:
   the length L is set to a range 30 μm≦L≦250 μm.

5. The waveguide type variable optical attenuator according to claim 1, wherein:
the substrate comprises a quartz glass substrate.

6. The waveguide type variable optical attenuator according to claim 1, wherein:
a thermal conductivity α of the high thermal-conductivity member is set to thermal expansivity ranging 100 W/mK≦α≦500 W/mK.

7. The waveguide type variable optical attenuator according to claim 1, wherein:
the high thermal-conductivity member covers the first arm waveguide, and extends to a region adjacent to the second arm waveguide.

8. The waveguide type variable optical attenuator according to claim 1, wherein:
the high thermal-conductivity member is arranged on the surface of the waveguide element via an electrical insulation layer, and the heater is covered with the electrical insulation layer, the electrical insulation layer arranged between the high thermal-conductivity member and the heater.

9. The waveguide type variable optical attenuator according to claim 1, wherein:
the high thermal-conductivity member extends on or over a center line between the first and second arm waveguides.

10. The waveguide type variable optical attenuator according to claim 1, wherein:
the heater is a single heater.

11. The waveguide type variable optical attenuator according to claim 1, wherein:
the high thermal-conductivity member covers the first arm waveguide, but not the second arm wave guide.

12. The waveguide type variable optical attenuator according to claim 4, wherein:
the high thermal-conductivity member extends over a half point of the spacing between the first and second arm waveguides.

13. A waveguide type variable optical attenuator, comprising:
a substrate for forming a waveguide for optical signal propagation;
a waveguide element comprising a first arm waveguide and a second arm waveguide arranged on a surface of the substrate for constituting a portion of the waveguide and cladding for covering the first and second arm waveguides and the surface of the substrate;
an output side waveguide connecting the first arm waveguide with the second arm waveguide and arranged to couple light from the first arm waveguide with light from the second arm waveguide; and
a single heater arranged on a surface of the waveguide element for heating the first and second arm waveguides, wherein:
the first and second arm waveguides and the output side waveguide constitute one optical interference circuit, the first and second arm waveguides are connected thermally to each other by the heater.

14. The waveguide type variable optical attenuator according to claim 13, wherein:
the heater extends on or over a center line between the first and second arm waveguides.

* * * * *

UNITED STATES PATENT AND TRADEMARK OFFICE
CERTIFICATE OF CORRECTION

PATENT NO. : 7,330,630 B2  Page 1 of 1
APPLICATION NO. : 11/373913
DATED : February 12, 2008
INVENTOR(S) : Koutarou Tanaka et al.

It is certified that error appears in the above-identified patent and that said Letters Patent is hereby corrected as shown below:

On the title page Assignee data should read as follows:

Item (73)    Assignee:    HITACHI CABLE, ~~INC.~~ LTD.

Signed and Sealed this

Thirtieth Day of September, 2008

JON W. DUDAS
*Director of the United States Patent and Trademark Office*